United States Patent [19]

Tash et al.

[11] Patent Number: 5,127,023
[45] Date of Patent: Jun. 30, 1992

[54] RETIMING DECODER/ENCODER

[75] Inventors: Harvey Tash; Robert Reed, both of San Diego, Calif.

[73] Assignee: The United States of America as represented by the Secretary of the Navy, Washington, D.C.

[21] Appl. No.: 560,927

[22] Filed: Jul. 18, 1990

[51] Int. Cl.⁵ .......................................... H04L 27/10
[52] U.S. Cl. .................................... 375/55; 375/87; 341/70
[58] Field of Search ................ 375/55, 87; 341/53, 341/70; 360/43, 44, 45

[56] References Cited

U.S. PATENT DOCUMENTS

| | | | |
|---|---|---|---|
| 3,659,286 | 4/1972 | Perkins et al. | 307/304 |
| 4,146,743 | 3/1979 | Raynham | 360/51 |
| 4,185,273 | 1/1980 | Gowan | 360/43 |
| 4,292,626 | 9/1981 | Smithlin | 375/55 |
| 4,302,845 | 11/1981 | McClaughry et al. | 375/82 |
| 4,371,847 | 2/1983 | Biard et al. | 330/307 |
| 4,449,119 | 5/1984 | Hanna et al. | 360/44 |
| 4,449,202 | 5/1984 | Knapp et al. | 364/200 |
| 4,453,157 | 6/1984 | Kaneko | 360/43 |
| 4,584,695 | 4/1986 | Wong et al. | 375/81 |
| 4,603,322 | 7/1986 | Blair | 375/55 |
| 4,631,733 | 12/1986 | Spiesman | 375/55 |
| 4,862,482 | 8/1989 | Patchen | 375/87 |
| 4,992,790 | 2/1991 | Montgomery | 375/87 |

*Primary Examiner*—Stephen Chin
*Attorney, Agent, or Firm*—Harvey Fendelman; Thomas Glenn Keough

[57] ABSTRACT

An apparatus is disclosed for retiming and decoding Manchester-encoded data to produce a locally-formatted waveform, and for encoding a locally-formatted waveform in a Manchester-encoded format. The apparatus includes an all-digital retimer which retimes the Manchester-encoded waveform while monitoring the waveform to detect the presence of a data frame therein. The retimer detects the data frame by identifying a synch bit which initiates a frame and detecting when a maximum intra-frame signaling distance has been exceeded. A decoder receives the retimed waveform, together with an envelope signal defining the data frame and decodes the retimed waveform into a locally-coded format. The encoder receives a locally-formatted signal together with a signal defining a data frame and encodes the locally-formatted signal into a framed Manchester-encoded signal.

20 Claims, 8 Drawing Sheets

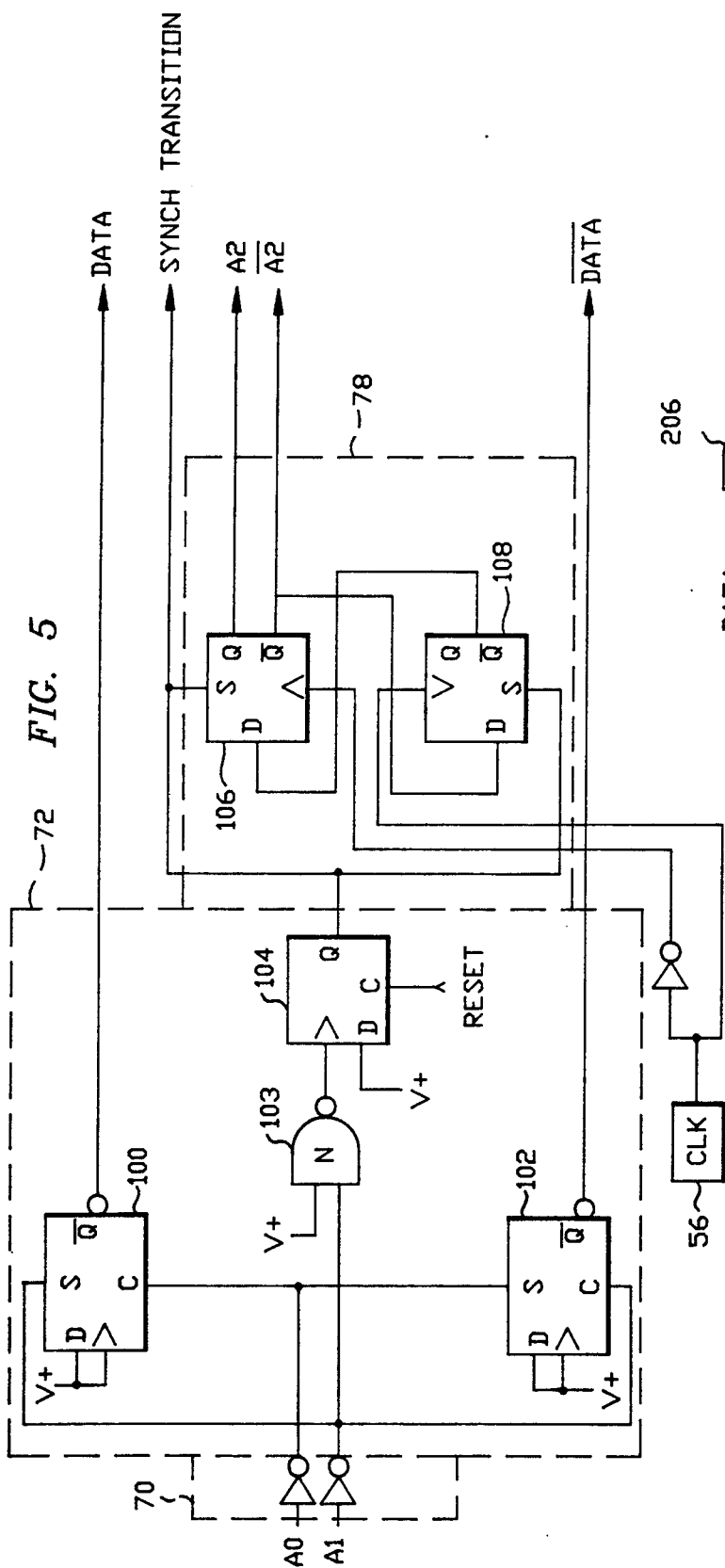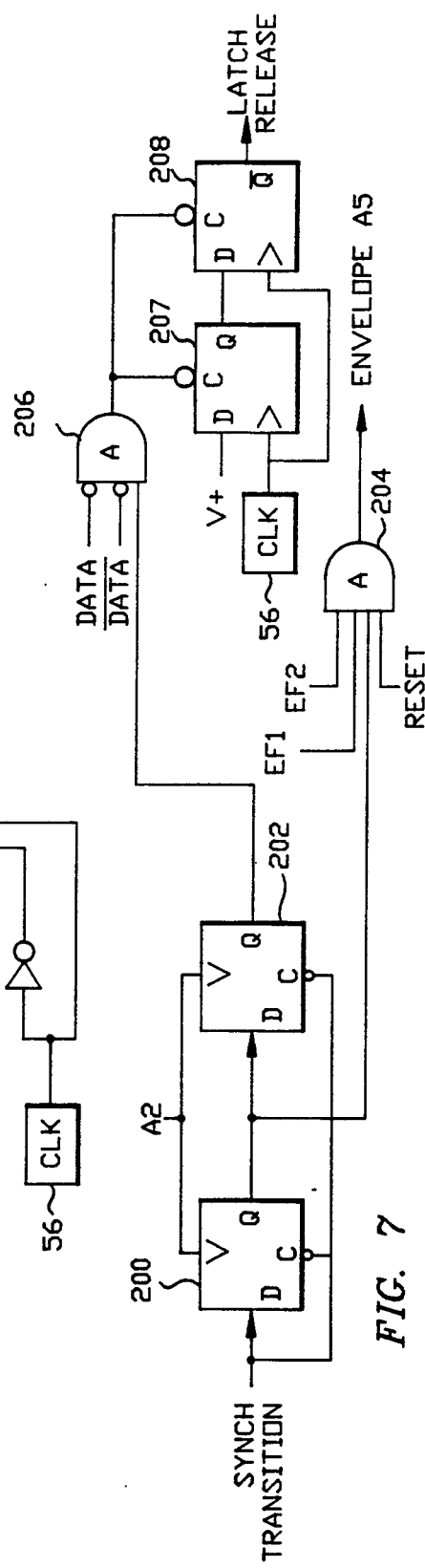
FIG. 5
FIG. 7

RETIMING DECODER/ENCODER

STATEMENT OF GOVERNMENT INTEREST

The invention described herein may be manufactured and used by or for the government of the United States of America for governmental purposes without the payment of any royalties thereupon or therefore.

BACKGROUND OF THE INVENTION

The present invention relates to the field of signal processing in preparation for encoding or decoding of Manchester-encoded signals, and more particularly, the invention concerns a retiming decoder/encoder which operates to decode or encode a Manchester signal waveform which is tailored to a particular transmission protocol.

Manchester encoding is a well-known technique in which data and data clock components are combined into a single encoded waveform. The encoded waveform is divided into time slots of equal duration commonly called data cells during each of which one binary digit (bit) of information is conveyed. The state of the bit is indicated by a transition in the waveform occuring at the center or mid-cell point of the data cell. The direction of the transition indicates the value of the bit. At least one signal transition per data cell occurs, providing a component in the frequency domain centered at twice the bit occurence rate.

The digital nature of the Manchester code provides the usual preservation of data information in the face of communication channel corruption by noise and other transmission effects. The timing component of the waveform eliminates the need for two physically separate transmission channels, one for data and one for timing.

As is known, a transmission standard, MIL-STD-1397B, Type E (NAVY), has been promulgated which provides for two-way information transfer in a single bi-directional transmission channel. The transmission scheme has three states: logic 1, logic 0, and an idle state. The protocol of this standard imposes a frame format in which up to a given number of bits are transmitted as an integral unit from an information source on the transmission line. A "synch" bit begins each frame. A frame may have three or more bits in addition to the synch bit. Each frame size is variable, and the end of a frame is indicated by the presence of the idle state.

An essential element of a communication system employing the data transmission and protocol approaches just described is an element which is able to convert a Manchester-encoded waveform (normally a three-state signal) to a two level digital waveform and which can convert a two level digital waveform into a Manchester waveform. Such an element is commonly referred to as a "codec", which is a shortened form of the term coder/decoder. As is conventional, codecs are important components of data links between computers and peripherals. Frequently, such data links must convey information over relatively great distances, thereby often employing a Manchester-encoded transmission channel. In such an application, a codec decodes data into a local format from the Manchester-encoded format and encodes locally-formatted data into the Manchester format.

Usually, the decoder portion of the codec includes a retiming provision through which the received Manchester signal is improved by reestablishing the relative timing of waveform transitions in which, prior to decoding.

Presently, most codecs which have provision for waveform retiming utilize discrete parts, some of which are analog and which are therefore susceptible to performance variations due to temperature and device tolerances. Additionally, it is difficult and expensive to implement analog components in large, predominantly digital, monolithic integrated circuit form. Many of these codecs also exhibit substantial throughput delays. Codecs which are designed to operate according to MIL-STD-1397B, Type E frequently fail to provide all control signals necessary to the local interface end of the transmission interface. Last, many of these latter codecs fail to synchronize the decoded signal with any local clock.

SUMMARY OF THE INVENTION

The present invention overcomes the limitations of earlier decoder/encoders and provides an apparatus whose decoding portion includes a data retimer for enhancing the timing characteristics of a received Manchester signal prior to decoding. Furthermore, the invention exclusively utilizes digital circuitry for retiming, decoding, and encoding, which reduces susceptibility to performance degradation due to temperature and device tolerance and facilitates implementation in monolithic integrated circuit form. A codec constructed according to the invention provides all control signals necessary to implement the requirements of a standard communication protocol (i.e. MIL-STD-1397B, Type E) when interfacing with local circuitry or with the transmission channel. Last, a local output signal representing a decoded Manchester waveform is provided by the invention in synchronism with a local clock.

The present invention includes a retiming decoder/encoder apparatus for receiving and sending a Manchester-encoded waveform including a plurality of data frames, each data frame including an initial syncronizing portion followed by a data portion. The apparatus includes a transceiver which responds to a received Manchester-encoded waveform by producing a first bilevel data signal corresponding to the received Manchester-encoded waveform and which responds to a second bilevel data signal by producing a Manchester-encoded waveform for transmission, the second Manchester-encoded waveform corresponding to the second bilevel data signal. In the apparatus, a digital retimer is connected to the transceiver and responds to a synchronizing portion of the first bilevel data signal and to the first bilevel data signal by producing a retimed data signal which corresponds to the received Manchester-encoded waveform. In the digital retimer, a storage component receives and shifts the first bilevel data signal to produce a reset signal signifying the end of a data frame which includes the synchronizing portion. The digital retimer also includes a digital detector which responds to the synchronizing portion and to the reset signal by producing an envelope signal identifying the boundaries of the data frame. A digital decoder is connected to the digital retimer and responds to the retimed data signal and to the envelope signal by producing an output data signal representing a decoded form of the received Manchester-encoded waveform contained in the data frame. The apparatus also includes the digital encoder responsive to an input data signal in the decoded format and connected to the transceiver which produces the second bilevel data signal in correspondence with the input data signal.

The invention also covers a data retiming apparatus which processes the waveshape of a complementary pair of bilevel data waveforms which correspond to a received Manchester-encoded waveform, the Manchester-encoded waveform including a data frame begun by a synch bit with first and second transitions and concluded by a period of time in which the Manchester-encoded waveform is quiescent. The data retimer includes a data reshaping portion which responds to the bilevel data waveforms by removing distortion from each waveform. A synch detector responds to a second transition in a synch bit of the complementary pair of bilevel waveforms by producing a synch transition signal. A digital clock generator connected to the synch detector provides a complementary pair of sampling clock waveforms in response to the synch transition signal. A timing window storage component connected to the data reshaping component, to the synch transition detector and to the digital clock generator shifts the pair of bilevel data waveforms through a window of time corresponding to a maximum period of time during which the Manchester waveform can be quiescent in response to the synch transition signal and to the complementary pair of sampling clock waveforms. A gate circuit connected to the window register component generates a signal signifying the end of a transmission frame in response to an absence of transitions in the portions of the bilevel data waveforms in the window register component.

It is therefore the primary object of the present invention to provide an improved decoder/encoder for use at the interface between a local digital environment and a Manchester-encoder transmission channel.

Another object of the present invention is to provide a retiming decoder/encoder for use in a Manchester-encoded transmission channel.

Still another object of this invention is to provide such a retiming decoder/encoder which decodes and encodes on behalf of a local environment Manchester-encoded data which is transferred according to a standard communication protocol.

A distinct advantage of this invention is its operation according to the requirements of MIL-STD-1397B, Type E.

The achievement of these objects and advantages by the present invention will be appreciated when the following detailed description is read in conjunction with the below-described drawings.

BRIEF DESCRIPTION OF THE DRAWING

FIG. 5 is a logic diagram illustrating data reshaping and clock generation components of the retimer of FIG. 4.

FIG. 7 is a logic diagram illustrating envelope detection and latch up prevention components of the retimer of FIG. 4.

DETAILED DESCRIPTION OF THE PREFERRED EMBODIMENTS

Figure 1A:
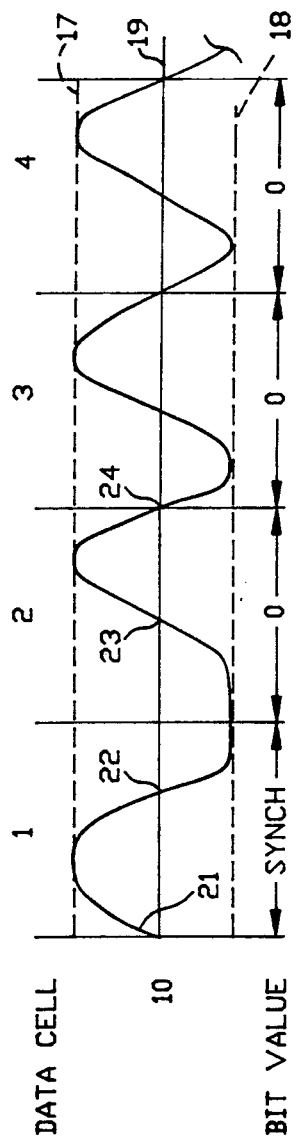
FIG. 1A illustrates a Manchester-encoded waveform formatted according to a communication protocol.

Manchester-encoded waveform 10, a pair of complementary bilevel data waveforms 12 and 14, and a frame waveform 16.

Assume that the Manchester-encoded waveform 10 has been received at a receiving point connected to a bi-directional communication channel in which the waveform transitions between signaling states 17 and 18 around a quiescent state 19. When no information is transmitted, the waveform 10 enters and assumes the quiescent state 19. Four data cells of an encoded portion of the waveform 10 are illustrated in FIG. 1, the first cell including a synch bit in which the mid-cell transition is from the level 17 to the level 18 through the quiescent level 19. (Hereafter, this transition will be referred to as a "negative-going" transition). In data cells 2, 3, and 4, the Manchester waveform makes mid-cell transitions from level 18 to level 17 (hereinafter, "positive-going" transitions). In the data transmission format for the waveform 10, negative mid-cell transitions denote a digital "one", while positive mid-cell transitions denote a digital "zero".

In the communication protocol of MIL-STD-1397B, Type E, the first bit in every frame of transmitted Manchester-encoded data has the pattern illustrated in FIG. 1, which corresponds to an encoded "1". This first data cell is referred to as a "synch bit". The purpose of the synch bit is to synchronize the incoming waveform to the operations of the terminal where it is received. For this, two transitions, indicated by 21 and 22 are provided. These two transitions are intended to afford the receiving and decoding circuitry at the local site an opportunity to move their operations into synchronicity with the incoming waveform. In this protocol, all cells which follow the synch bit are randomly encoded according to the needs and circumstances of any transmission.

Typically, when a Manchester-encoded waveform such as the waveform 10 is received at a local terminal after transmission through a channel, a transceiver terminates the transmission channel and converts the Manchester waveform into a pair of complementary bilevel data waveforms, such as the waveforms 12 and 14. The waveforms are bilevel in that they have two levels between which they transition. The waveforms 12 and 14 are typically provided by the transceiver to decoding circuitry for conversion to a local data format. Hereinafter, the local data format is considered to be NRZ coding, although this is intended for example only and not as a limitation on the practice of this invention.

Processing the Manchester waveform through the transmission channel and through a transceiver imposes two significant artifacts on the waveforms 12 and 14. First, transmission through the channel characteristically widens the first half of the synch bit with respect to the corresponding widths of subsequent bits. Thus, in the waveform 10, the width 21-22 is greater than the width 23-24. Second, in converting the waveform 10 to the complementary waveforms 12 and 14, a transceiver reduces the pulse widths. Thus, the width 24-26 is less than the width 21-22, and the width 28-30 is less than the width 23-24. Hereinafter, these two effects are referred to, collectively, as "timing distortion".

Typically, if the complementary bilevel data waveforms 12 and 14 were to be fed directly to a decoder which decodes by sampling one or both of these waveforms midway between the beginning of a data cell period and the halfway point, the timing distortion in these waveforms could seriously degrade the decoding process for two reasons. First, the shortening of the pulses provides less settling time for the level being sampled. Second, if the leading transition 24 is used to synchronize the sampling clock, the sampling clock tends to advance in phase with respect to the waveforms 12 and 14 because of the relatively early occurrence of the transition 24. This tends to shift the sampling point from the quarter cell point midway between the beginning and the middle of each data cell toward the beginning of the cell. This is indicated by the arrow 40 in FIG. 1.

It should be evident that the operational reliability of any decoder that operates in response to the waveforms 12 and 14 will be adversely affected by the timing distortion just described. Typically, a retimer is provided to reduce this form of distortion. The retimer of the invention eliminates timing distortion by synchronizing a sampling clock with the second synch bit transition, and by producing complementary bilevel waveforms in which pulse widths are broadened.

Figure 1B:
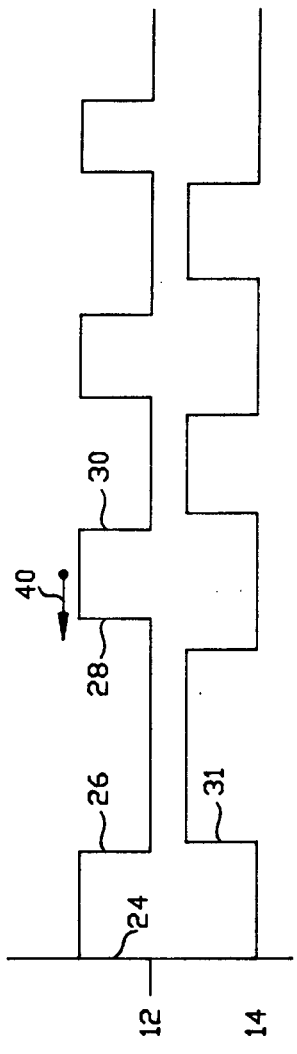
FIG. 1B illustrates reception of the Manchester-encoded waveform through a transmission channel transceiver.
Figure 2:
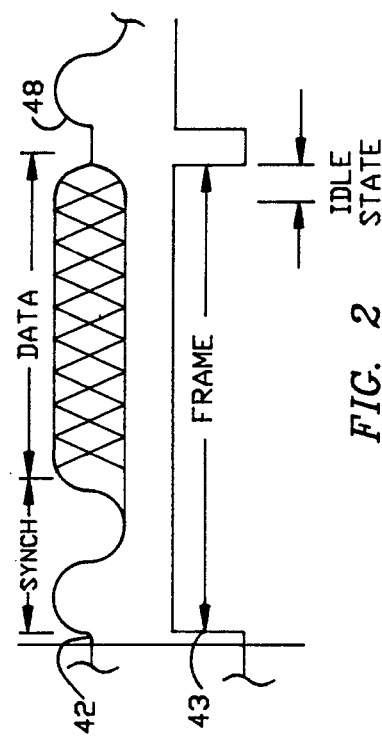
FIG. 2 is a waveform drawing illustrating a data frame according to a predetermined communication protocol.

FIGS. 1A, 1B and 2 illustrate the framing feature of a communication protocol according to the MIL-STD referenced above. In this regard, the Manchester-encoded waveform 42 in FIG. 2 comprises a data frame of Manchester-encoded data including a synch bit and a data part which, together, form a data frame of the Manchester-encoded waveform. The frame 44 is separated from a following frame by the presence of the idle state. Since MIL-STD-1397B requires intra-frame transitions to be separated by no more than 100 ns, an absence of transitions for this period of time or longer also means that a frame has ended. Therefore, an interframe gap between the end of one frame and the beginning of the next exists which corresponds to the time between the last signal transition in the preceding frame and the positive-going transition in the synch pulse of one succeeding frame. Thus, in FIG. 2, the end of the interframe gap is signified by the positive transition 48 beginning the synch bit of the following frame.

An important control signal for decoding operations is embodied in a frame signal 43 illustrated in FIG. 2. Ideally, the frame signal 43 goes positive with the positive transition in the synch bit of the Manchester waveform and falls when the end of the frame is reached. The frame signal 43 is necessary to "gate" decoding activities and to indicate the presence of valid data to be decoded.

It is asserted that a standard transceiver also operates to encode a Manchester waveform in a manner which is the inverse of that just described. In this regard, on the presentation of a frame signal 16 and a pair of complementary bilevel data signals such as 12 and 14, a transceiver would generate a Manchester-encoded signal for transmission on a data channel by modulation around the quiescent level 19. Such transceivers are known in the art and are commercially available. Therefore, their operations will not be presented in this description.

Figure 3:
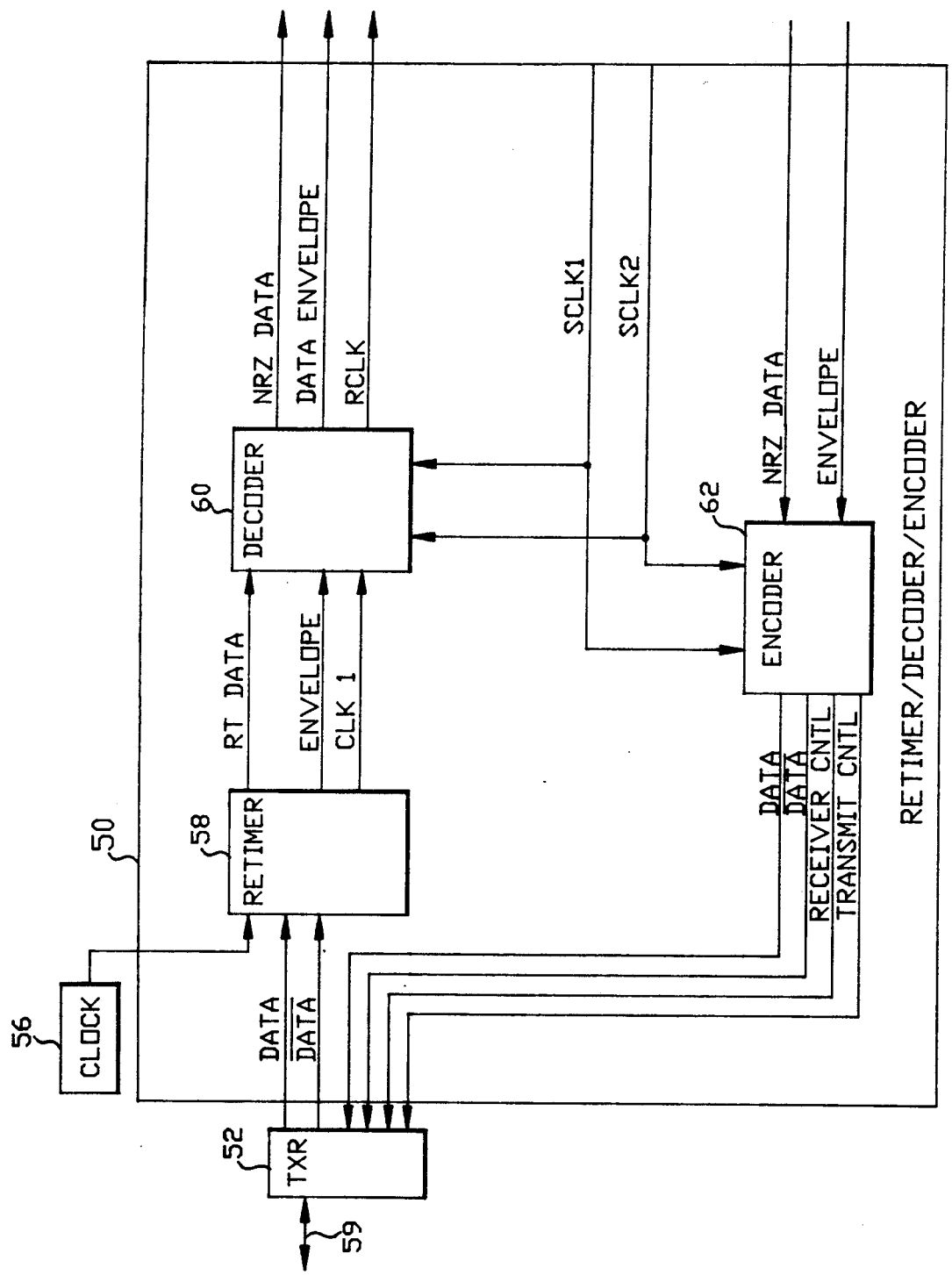
FIG. 3 is a block diagram showing elements of the invention in combination with a transceiver connected to a bi-directional transmission line.

The retiming decoder/encoder of the invention is illustrated in block diagram form in FIG. 3. In FIG. 3 a retiming decoder/encoder according to the invention is indicated by reference numeral 50. Hereinafter, the retiming decoder/encoder will be referred to by the acronym RDE. The RDE 50 is connected to a conventional transceiver (TXR) 52 and to a free-running clock source (CLOCK) 56. The RDE 50, the TXR 52, and the CLOCK 56 are co-located at a local terminal which is connected to a bi-directional transmission line 5a on which a data-framed Manchester-encoded waveform is employed for communications between the local site and another terminal connected to the other end of the transmission line 59.

The RDE 50 of the invention includes a retimer 58, a decoder 60, and an encoder 62. The retimer receives data inputs from the TXR 52 in the form of a pair of complementary bilevel data signals as described above. The retimer also receives a free-running clock signal from the CLOCK circuit 56.

The retimer 58 retimes the pair of complementary bilevel data 8 signals and removes the timing distortion described above. The retimed signals are provided as RTDATA (and its complement $\overline{\text{RTDATA}}$). The retimer 58 also provides an ENVELOPE signal and a clock CLK 1 which is synchronized to the envelope and retimed signals. All of these signals are input to the decoder 60 with the exception of $\overline{\text{RTDATA}}$.

The decoder 60 processes the signals received from the retimer 58 to decode the pair of complementary bilevel data signals into a local format, preferably the well-known NRZ data format. The decoder 60 also provides a DATA ENVELOPE signal for the decoded, locally formatted data signal. The decoder 60 also receives system clock signals SCLK 1 and SCLK 2 to synchronize the NRZ and DATA ENVELOPE signals with local operations, and provides a clock RCLK synchronized with these signals.

The encoder 62 receives locally-coded data, together with a data envelope signal and the two system clocks to produce a pair of complementary bilevel data signals, together with receive and transmit control signals, all of which are provided to the transceiver 52 for generation of a Manchester-encoded waveform.

Figure 4:
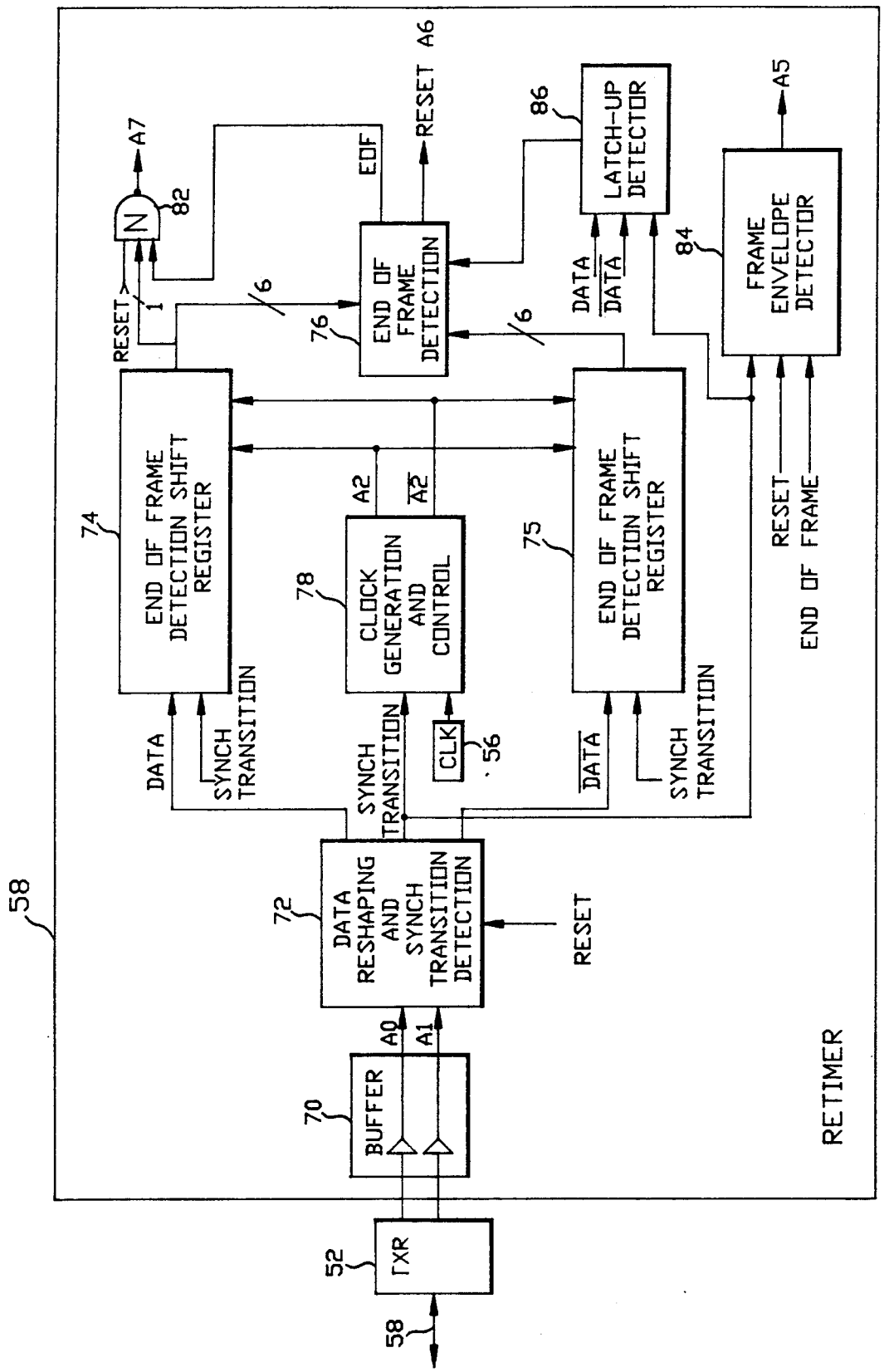
FIG. 4 is a more detailed block diagram of a retimer illustrated in FIG. 3.

Refer now to FIG. 4 for a more detailed description of the retimer. The retimer 58 receives the complementary binary data signals from the transceiver 52. At the output of the buffer 70 these signals are denoted A0 and A1. These signals are fed to a data reshaping and synch transition detection circuit 72. In the discussion following, it is assumed for the sake of example that A0 and A1 correspond with the waveforms 12 and 14 of FIG. 1B.

The circuit 72 serves to correct the timing distortion of the A0 and A1 signals. After retiming, the signals are passed as the DATA and $\overline{\text{DATA}}$ to shift registers 74 and 75, respectively, for end of frame detection. The circuit 72 also looks for the synch bit in the data frame. In response to the synch bit, the circuit 72 produces a SYNCH TRANSITION signal which initiates the operations of the retimer 58. The SYNCH TRANSITION signal is fed to the registers 74 and 75 to enable the registers to serially receive and shift the DATA and $\overline{\text{DATA}}$ signals. Each shift register includes six serially-connected flipflops for serial shifting of the DATA and $\overline{\text{DATA}}$ signals, respectively.

The SYNCH TRANSITION signal is also fed to a clock generation and control circuit 78 which receives the output of the clock 56 and, in response to the SYNCH TRANSITION signal, produces a pair of complementary clocks A2 and $\overline{\text{A2}}$. The clock signals A2 and $\overline{\text{A2}}$ are used to double clock registers 74 and 75. The registers 74 and 75 serially shift the DATA and $\overline{\text{DATA}}$ signals through a window of time which is wide enough to detect the end of a data frame.

Relatedly, the preferred embodiment of this invention assumes that the Manchester-encoded signal has a data rate of 10 MHz and a clock rate of 20 MHz. Thus, while the Manchester coded data is being received, data bit transitions will occur at 100 ns intervals at the midpoint of each data cell. Each data cell is also 100 ns wide. Therefore, in order to clock this data through the registers 74 and 75, optimum clocking requires that the sampling clock edge fall at the one-quarter and three-quarter points in Manchester data cell in order to avoid the transition that always occurs at the midpoint. This is accomplished by the clock generation and control circuit 78 which is arranged to delay the output of the first clock pulse by a nominal amount of 25 ns after being released by the SYNCH TRANSITION, which corresponds to the second transition of a data frame. The clock generated by the circuit 78 is derived from an input signal generated by the clock circuit 56. Preferably, the clock circuit 56 generates a free-running 40 MHz clock which is asynchronous with the data received from the transceiver. However, the speed of this clock means that the clocks A2 and $\overline{\text{A2}}$ which are derived from it will nominally vary no more than $\pm 12.5$ ns about the one-quarter and three-quarter points in the data cell, and will fall within the first and last half of the data cell period.

Since data bit transitions occur at 100 ns intervals about the midpoint of a Manchester data cell while data is being received, the test for the end of a data frame must be greater than 100 ns in order to detect a cessation of transitions. In the present circuit, the end of a data frame is detected when a period of 150 ns transpires during which no transitions in the pair of complementary binary data signals A0 and A1 occur. Therefore, the shift registers 74 and 75 constitute 150 ns windows through which the DATA and $\overline{\text{DATA}}$ signals are shifted, respectively.

As the transitions in the data signals stop, either the DATA or $\overline{\text{DATA}}$ signal will remain high due to the last transition. This high level will eventually fill one of the shift registers 74 or 75. An end of frame detection circuit 76 constantly monitors the contents of the shift registers 74 and 75. When the first of these registers is entirely filled with high-level signals, the circuit 76 will activate a RESET signal, indicating the end of the data frame. The RESET signal, when active, stops the operation of the clock generation and control circuit 78 and places it in a quiescent state. In turn this will clear the outputs of the shift registers 74 and 75, causing them to go low, deactivating the RESET signal and returning the circuit to the starting point of the cycle.

Figure 6:
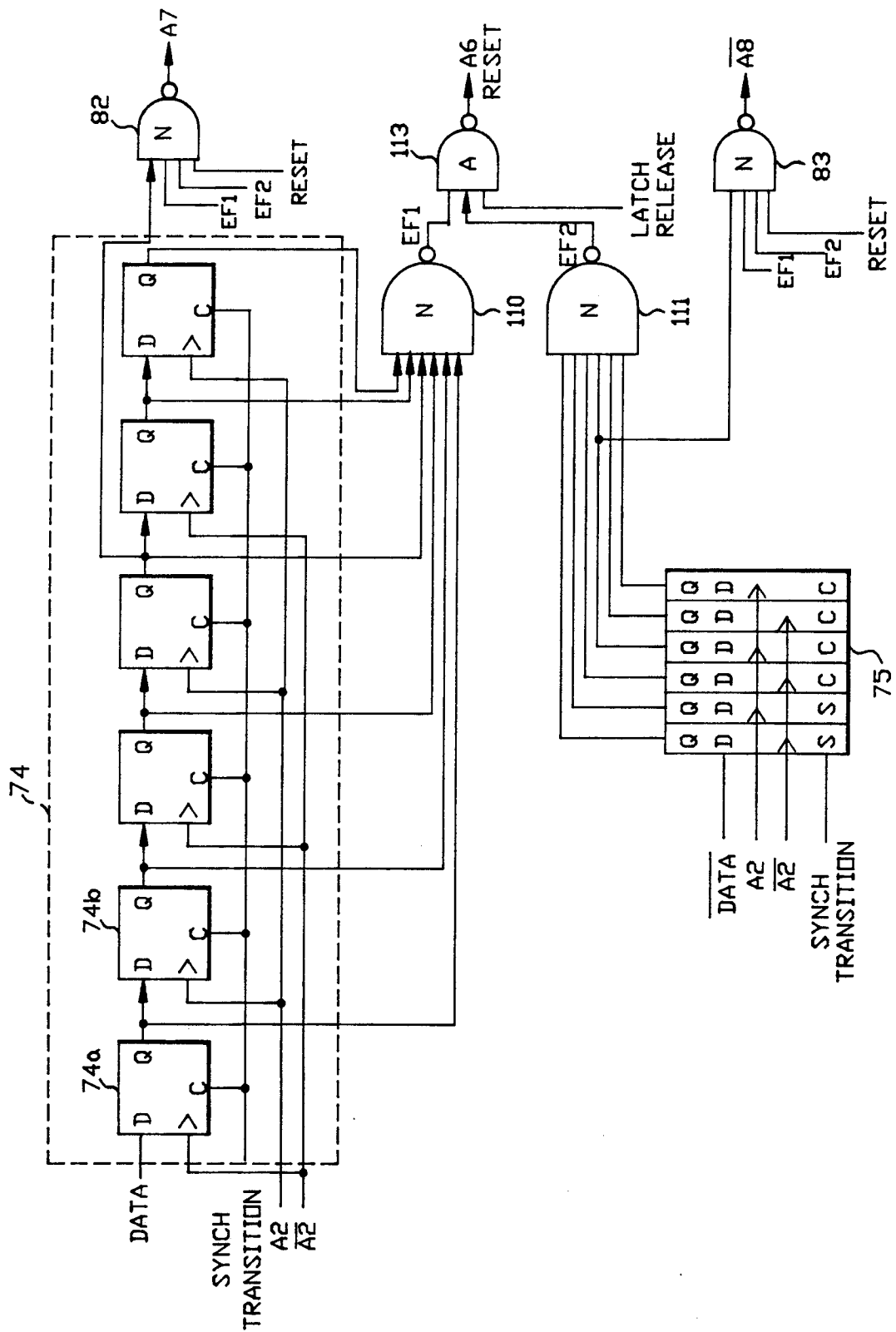
FIG. 6 is a logic diagram illustrating end-of-frame detection shift registers and an end-of-frame detection component of the retimer of FIG. 4.

A signal EOF is generated as a precursor to the RESET signal by the circuit 76. This signal, together with the RESET signal is fed to a NAND gate 82 which also receives the output of the fourth flipflop of the shift register 74. For so long as the end of the current data frame has not been detected, the NAND gate 82 outputs RTDATA signal which is the retimed and delayed positive-sense DATA signal input to the shift register 74. This signal is denoted as A7 in FIG. 4 and it corresponds to the waveform 12 in FIG. 1B after retiming. This signal is identical with the RTDATA signal in FIG. 3. A retimed $\overline{\text{RTDATA}}$ signal (A8) is similarly produced by a NAND gate 83 which is illustrated in FIG. 6.

The frame envelope signal, denoted as A5 in FIG. 4, is produced by a frame envelope detector 84. The frame envelope detector receives the SYNCH TRANSITION signal that begins the generation of the clocks A2 and $\overline{\text{A2}}$ and the RESET and EOF signals generated by the circuit 76. These signals are used by the circuit 84 to generate the frame envelope signal which is fed forward to the decoder 60.

It is sometimes the case that phase drift between the pair of complementary binary data signals will cause a slight overlap, thereby presenting the same level for both signals to the retimer. This can cause the end of frame detection circuit 76 to fail to produce the EOF and RESET signals. When this occurs, the latch up detector 86 will pulse the circuit 76 to activate the RESET signal.

Refer now to FIG. 5 for further explanation of data reshaping and synch transition detection circuit 72 and clock generation and control circuit 78 which are both shown in the retimer block diagram of FIG. 4. As FIG. 5 illustrates, the signals A0 and A1 are buffered at 70, each through a respective buffer inverter. The positive sense signal, A0, is fed to the CLEAR (C) port of flipflop 100 and the SET(S) port of flipflop 102. The inverted signal A1 is fed to the SET port of the flipflop 100 and to the CLEAR port of the flipflop 102. As thus connected, the flipflops 100 and 102 are driven by the A0 and A1 signals, without clocking. This removes the timing distortion from these respective waveforms, with the flipflop 100 providing the retimed DATA signal and the flipflop 102 providing the retimed $\overline{\text{DATA}}$ signal. A NAND gate 103 has two inputs, one tied to a positive signal level. The other input of the NAND gate 103 receives the inverted form of the A1 signal. Therefore, at the first positive transition of this signal, corresponding to the negative-going transition at the mid-cell point of the synch bit in a Manchester-encoded data frame, the output of the NAND gate will fall. This falling transition is fed to the clock input of flipflop 104. At the end of the data frame preceding the current one, the RESET signal will have been activated, clearing the flipflop 104. When a negative-going pulse is produced by the NAND gate 103, the V+ potential of the D input of the flipflop 104 will cause the Q output to transition positively. For the remainder of the current data frame, the Q output will remain in a positive digital level. At the end of the frame, the RESET signal will once again reset the flipflop 104, causing the Q output to transition to a "zero" level. This output produces a SYNCH TRANSITION signal denoting the beginning of a data frame.

In the clock generation and control 78, the free-running 40 MHz clock is fed in inverted form to a flipflop 106 and in positive form to a flipflop 108. With the SYNCH TRANSITION signal transitioning to a positive digital level at the beginning of a data frame, the flipflops 106 and 108 will conventionally divide the 40 MHz clock by half. This division will result in the provision of a 20 MHz clock at the Q output of flipflop 106.

This clock is denoted as A2. In parallel, the $\overline{Q}$ output of the flipflop 106 will produce a clock $\overline{A2}$, which is the complement of the A2 clock.

When the SYNCH TRANSITION signal transitions to a positive level, the flipflops 106 and 108 will operate in response to input clocks. The flipflop 108 is driven by the positive phase of the 40 MHz clock, while the flipflop 106 is driven by the complement of this clock. The phase of the clocks A2 and $\overline{A2}$ is determined by which of the flipflops 106 or 108 first receives a positive clock transition at its input after activation of the SYNCH TRANSITION signal. Since the period of 40 MHz clock is 25 ns, a delay of no greater than one half of the 40 MHz clock period will elapse before the outputs of the flipflops 106 and 108 are active. This accounts for the nominal ±12.5 ns variation about the sampling points of the DATA and $\overline{DATA}$ waveforms.

Refer now to FIG. 6 for more detailed explanation of the shift registers 74 and 75. In FIG. 6 it is understood that the shift register 75 is equivalent in all structural respects to the shift register 74. However, the shift register 74 shifts the DATA signal, on the shift register 75 shifts its complement, the $\overline{DATA}$ signal. In shift register 74, six flipflops are connected conventionally for serially shifting the DATA waveform to the NAND gate 82. The CLEAR port of each flipflop is connected to receive the SYNCH TRANSITION signal. The first, third, and fifth flipflops are clocked by the A2 signal, while the second, fourth, and sixth flipflops are clocked by the $\overline{A2}$ signal. When the SYNCH TRANSITION signal goes positive, the flipflops will serially shift consecutive samples of the DATA signal to the NAND gate 82. In the shift register 74, the first positive transition of the A2 clock signal will sample the DATA waveform at approximately the three-quarter point in the synch bit. Thereafter, it will alternately sample at the one-quarter and three-quarter points for each succeeding data cell. When data stops being input to the retimer, one or the other of the signals DATA or $\overline{DATA}$ will remain high due to the final transition in a frame. As this high level propagates through one or the other of the shift registers 74 or 75, the outputs of the flipflops comprising the shift register will all be high. Thus all of the inputs to either the NAND gate 110 or the NAND 111 will be high, causing the output of the gate to fall. The falling signal output by one of the NAND gates 110 or 111 is denoted as an end of frame signal, with that produced by the gate 110 denoted as EF1 and that by the gate 111 as EF2. Assuming that an input signal LATCH RELEASE is high, when one or the other end of frame signals transitions to its low state, output of the AND gate 113 will fall. The output of the AND gate 113 is the RESET signal. When this signal falls, it signifies the end of a data frame.

Referring once again to the shift register 74, it should be evident that the shift register comprises a window spanning one and one-half data cells (or 150 ns) of the DATA waveform. This window is sufficient to detect cessation of signaling because it will reveal the absence of a mid-bit transition in two successive data cells.

The negative transition of one of the end of frame signals resets the DATA and $\overline{DATA}$ signals output by gates 82 and 83 in advance of the actual RESET signal. This is necessary in order to not extend the pulse width of the last bit any more than absolutely necessary after the data stops, before RESET occurs.

As FIG. 6 illustrates, the DATA and $\overline{DATA}$ signals are derived through the NAND gates 82 and 82 from the fourth flipflops of the registers 74 and 75, rather than the last. This reduces the throughput delay of the retimer, without affecting detection of the end of a data frame. In this regard, the last two flipflops represent the 50 ns time from the mid-cell point of the preceding cell to the beginning of the current cell.

Refer now to FIGS. 5 and 6 for an understanding of how clock generation and data reshaping are affected by the RESET signal. When a data frame ends, the flipflops 100 and 102 will have stopped transitioning and will remain in respective states determined by the last transition of the just-ended data frame. When the RESET signal transitions negatively, it clears the flipflop 104. This causes the SYNCH TRANSITION signal to fall and remain low until the negative-going transition of the synch bit in the next frame clocks the flipflop 104. When the SYNCH TRANSITION falls, the outputs of the flipflop 106 and 108 are forced high, thereby disabling the clock output A2 and $\overline{A2}$. The negative-going transition of the SYNCH TRANSITION signal is fed to the clear ports of all of the flipflops comprising the shift register 74. This presets all of the Q outputs to zero, thereby raising the output of the NAND gate 110. In the shift register 75, the SYNCH TRANSITION is fed to the set ports of the two leftmost flipflops in the shift register (these flipflops correspond in position to the flipflops 74a and 74b in shift register 74) and to the clear ports of the four rightmost flipflops in the shift register. With the shift register 75 thus preset, activation of the A2 and $\overline{A2}$ clocks will cause the A7 output from the NAND gate 83 to initially transition negatively when the third flipflop of register 75 receives the set signal, thereby giving the illusion of retimer response to the positive-going transition at the beginning of the data frame synch bit.

Refer to FIG. 7 for an understanding of how the envelope signal is generated. The frame envelope detector 84 includes two flipflops 200 and 202 and a NAND gate 204. At the end of a frame, when the SYNCH TRANSITION signal is deactivated, the flipflops 200 and 202 are cleared. At the beginning of the frame, when the SYNCH TRANSITION signal is activated, the A2 clock sequences the positive state of this signal through the flipflops 200 and 202 to the NAND gate 204. The other inputs to the NAND gate 204 are the two end of frame signals and the RESET signal. Thus, the output of the NAND gate 204 transitions positively on the second positive-going edge of the A2 clock following the rise of the SYNCH TRANSITION signal. This inserts the same amount of delay into the positive-going transition of the ENVELOPE signal as is encountered through the shift registers 74 and 75 before the DATA and $\overline{DATA}$ signals are available to the gates 82 and 83. When either of the end of frame signals goes negative, the NAND gate 204 is disabled, resulting in the negative transition of the ENVELOPE signal in synchronism with the data frame.

A latch up circuit includes an NAND gate 206 and a pair of flipflops 207 and 208 clocked by the free-running CLOCK 56. For so long as the DATA, $\overline{DATA}$ and ENVELOPE signals are not simultaneously positive, the output of the NAND gate 206 is inactive. This maintains the $\overline{Q}$ output of the flipflop 208 in a high state. However, if all three of the inputs to the NAND 206 are simultaneously high, the output of the gate 206 will transition high, enabling the positive level at the input of the flipflop 207 to propagate through to the flipflop 208 at twice the data rate of the Manchester-encoded signal. This will cause the $\overline{Q}$ output of the flipflop 208 to go low, thereby disabling the output of the NAND gate 113 (FIG. 6) and activating the RESET signal by causing it to pulse low. Use of the free running 40 MHz clock insures that the latch up condition will be clear before the beginning of the next data frame.

Figure 8:
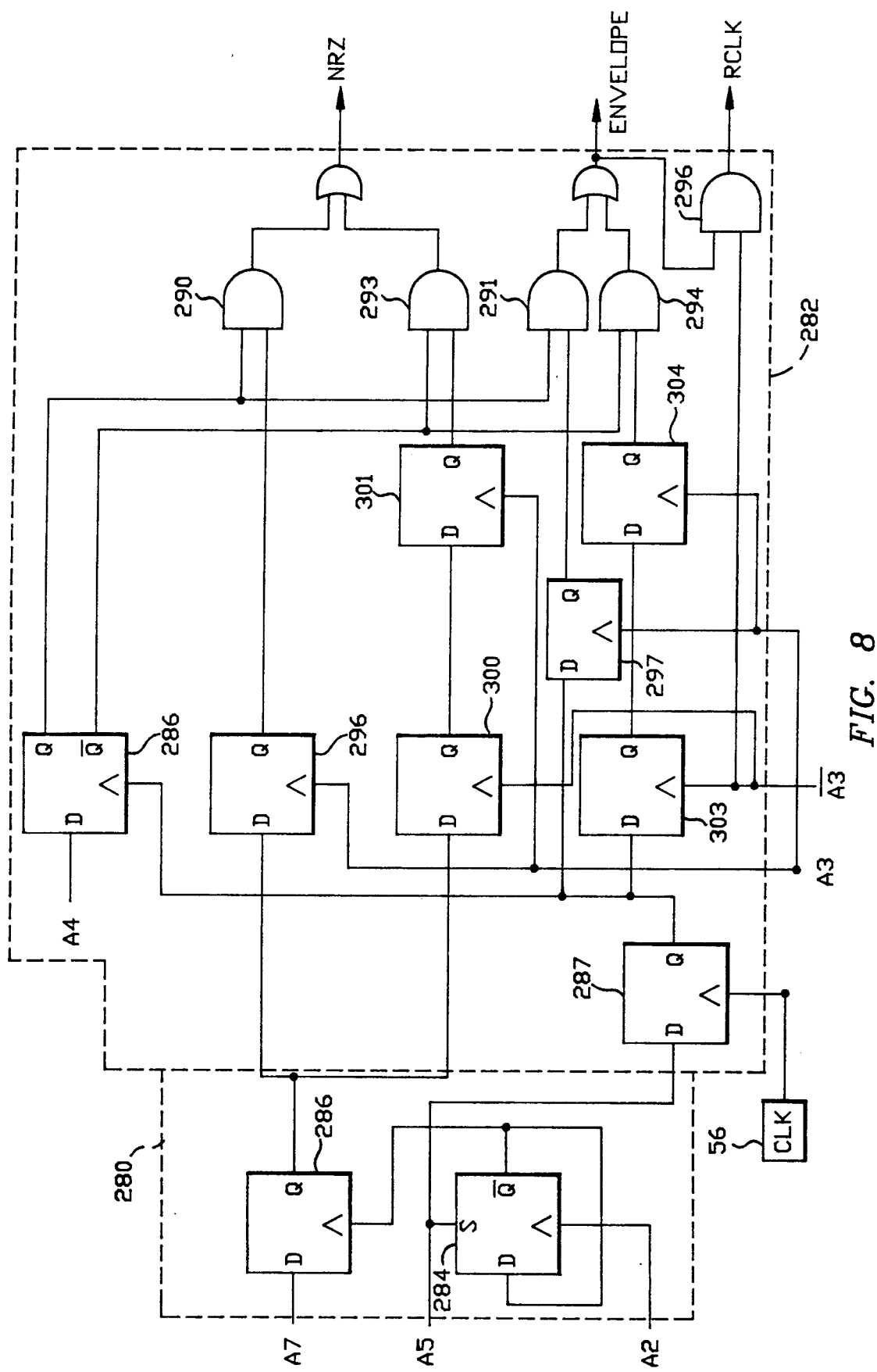
FIG. 8 is a logic diagram of the decoder of FIG. 3.

The decoder 60 is illustrated in greater detail in FIG. 8 and includes a conventional Manchester decoder 280 connected to drive a synchronizer 282. The Manchester decoder 280 operates to derive NRZ coded data from the retimed data waveform output by the NAND gate 87 and the retimer. Decoding commences when the envelope signal enables a flipflop 284. The flipflop 284 utilizes the 20 MHz clock A2 from the retimer, divides it, and clocks the first half of each Manchester bit in the retimed data waveform into the flipflop 286 at a 10 Hz rate. Resultantly, the flipflop 286 outputs the information contained in the Manchester-encoded waveform in NRZ data format. As is known the NRZ data contains transitions which are one half the frequency of the Manchester-encoded data. The ENVELOPE signal is passed forward with the NRZ data to provide and envelope around the NRZ data in order to convey information about the start and end of the data frame.

At the output of the Manchester decoder 280, the envelope and NRZ signals are available. Now, these two signals are synchronized with a system clock A3 or with its inverse $\overline{A3}$. Which clock is used depends which has its rising edge at the proper point with respect to the NRZ data. In this regard, the synchronizer 282 selects whichever of these two clocks has its rising edge closest to the center NRZ bit time. In order to provide the synchronization, a second system clock A4 which has a known phase relationship with the system clock A3 is used. By imputing A4 to the flipflop 286, and using the rising edge of the ENVELOPE signal to clock it out by way of the flipflop 287, the Q and $\overline{Q}$ outputs of the flipflop 286 will enable either a first pair of AND gates 290 and 291 or a second pair of AND gates 293 and 294. The AND gates 290 and 291 are fed by flipflops 296 and 297, each of which is clocked by the A3 system clock. The AND gates 293 and 294 are each fed by a pair of flipflops. The first pair includes flipflops 300 and 301; the second pair of flipflops includes 303 and 304.

In operation, the NRZ and envelope signals are brought up to the synchronizer 282, with the NRZ signal provided to flipflops 296 and 300, while the ENVELOPE signal is fed to flipflops 297 and 303 by a flipflop 287. It is asserted that the nature of the relationship between the system clocks A3 and A4 results in their being offset by 25 ns in the preferred embodiment. Now, at the first positive transition of the system clock A4 following clocking of the ENVELOPE signal rising edge through the flipflop 287, the outputs of the flipflop 286 will transition (with the Q output being inverted). The Q output will enable the AND gate 290 and 291, while the $\overline{Q}$ output will enable gates 293 and 294. In effect this selects A3 or $\overline{A3}$ as the clock to be used. In other words, if the clock A4 is high at the time it is clocked into the flipflop 286, then the clock A3 will be used. Otherwise, the clock $\overline{A3}$ will be used. If the clock A3 is used, it is followed by a clocking pulse from the clock $\overline{A3}$ through the flipflops 301 and 304 in order that in all cases the outputs are synchronized only to the clock A3.

Last, the decoder of FIG. 8 outputs a reconstituted clock RCLK through an AND gate 296 which is gated by the ENVELOPE signal output by the synchronizer 282. When this signal goes high the A3 clock is output by the gate 296.

Figure 9:
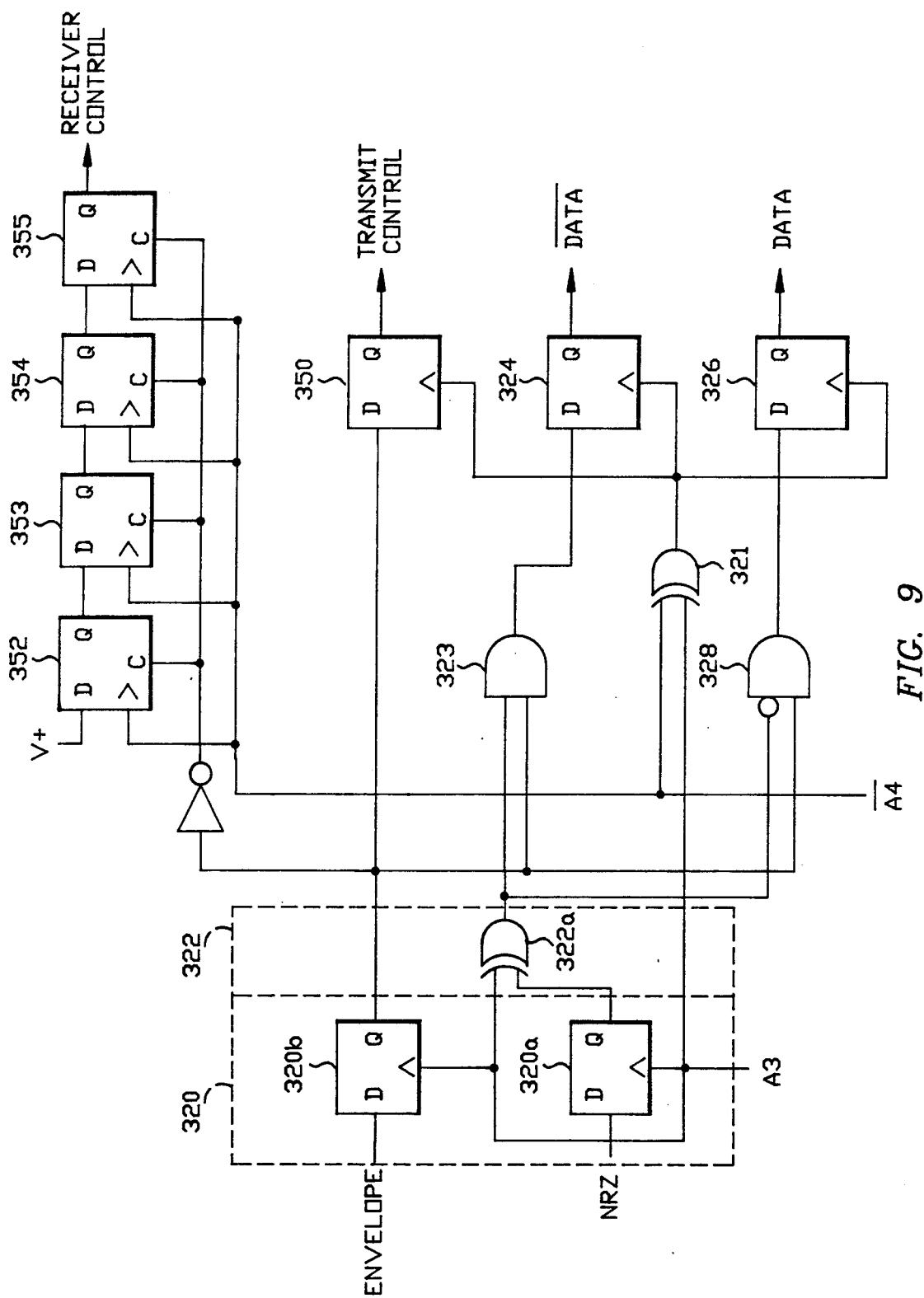
FIG. 9 is a logic diagram of the encoder of FIG. 3.

Manchester encoding is performed by the encoder 62, which is illustrated in greater detail in FIG. 9. Assume an application in which NRZ data has previously been clocked out of the decoder 60 in synchronism with the system clock A3. Now, the system clock A3, the inverse clock A4, a stream of NRZ data, and an envelope around the NRZ data are conventionally clocked and encoded in the Manchester format at 320 and 322. Since the clock A3 is a 10 MHz clock, this provides a full clock period of 100 ns for the NRZ data clocked out of the decoder with A3 to stabilize before being clocked in. Both the NRZ and the envelope are clocked in at flipflops 320a and 320b, respectively. The output of the flipflop 320a is input to an EXCLUSIVE-OR gate 322a and combined therein with the system clock A3. The resulting output encodes the NRZ data in a Manchester format with the characteristic transition occuring at the midpoint of every data cell. The output of the EXCLUSIVE-OR gate 322a is fed forward through an AND gate 323 which is enabled by the envelope signal. The output of the AND gate 323 is clocked into the flipflop 324 by a 20 MHz clock signal generated by a EXCLUSIVE-OR gate 321 which combines the system clock A3 and the system clock A4 into a 20 MHz clock. The output of the EXCLUSIVE-OR gate 322a is inverted and gated through an AND gate 328 in response to the ENVELOPE signal wherefrom it is clocked as the DATA signal to the transceiver 52.

In order to properly configure the transceiver 52, transmit control and receiver control signals are generated from the ENVELOPE signal. In the first instance, when the ENVELOPE signal goes positive, the flipflop 350 generates the transmit control signal, signalling the transceiver 52 that it is to configure itself for transmission of Manchester-encoded data in response to a pair of complementary binary data signals, DATA and $\overline{DATA}$, which are being output by the flipflops 326 and 324, respectively. At the same time, the envelope signal is inverted and used to reset a receiver control signal generated by flipflops 352 through 355. When the envelope signal is inactivated, the transmit control signal is inactivated by the following output of the flipflop 350. At the same time, a preset is removed from the flipflops 352 through 355 which, in four pulses of the inverted system clock A4, activate the receiver control signal indicating to the transceiver 52 that it should stand by to receive signals from transmission line 58. This delay in activating the transceiver's receiver circuit after transmission is known as "blanking time" and is provided by the invention in conformance with MIL-STD-1397B, Type E.

Figure 10:
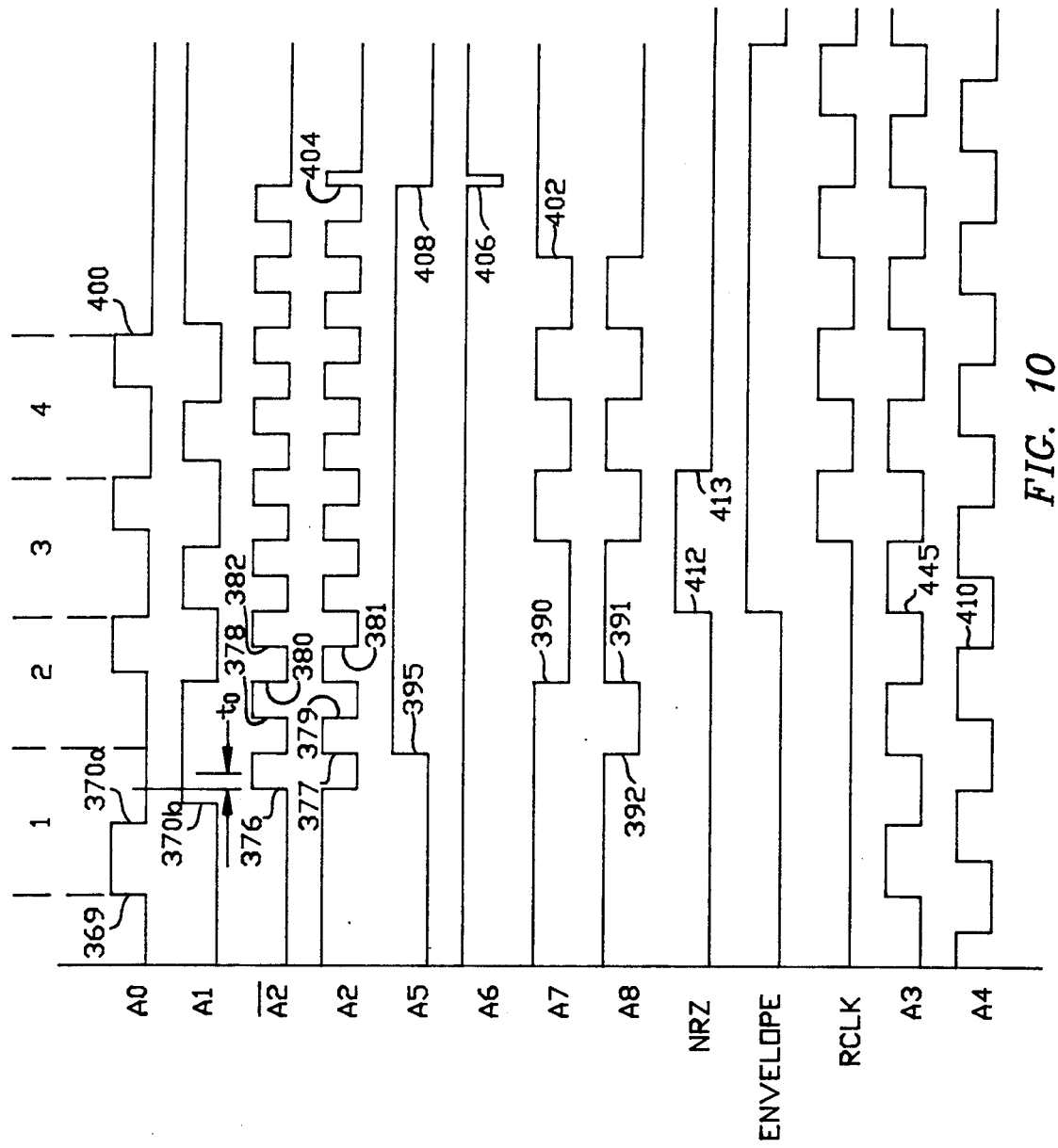
FIG. 10 is a set of waveform drawings illustrating operations of the retimer, decoder, and encoder illustrated in FIGS. 3-9.

The operation of the retimer/decoder portion of the invention is illustrated by the waveforms of FIG. 10. In FIG. 10, a pair of complementary bilevel waveforms A0 and A1 are illustrated with reference to the A2 and $\overline{A2}$ waveforms generated by the clock generation and control circuits 78. In waveform A0, the positive transition 369 represents the positive-going transition of the synch bit of a Manchester waveform. The invention ignores this transition and responds, instead, to the negative-going transition of the synch bit, which is represented by the transitions 370a and 370b in the A0 and A1 waveforms. Since these transitions represent the mid-point of the synch bit, location 372 represents the three-quarter point in the synch bit where initial sampling by the shift registers 74 and 75 is to take place.

Recall that the 40 MHz clock generated by clock source 56 is free-running. Recall also that the clock generation and control circuit 78 responds to the first positive-going edge of the free-running clock that occurs after the SYNCH TRANSITION signal rises. The asynchronous relationship between A0 and A1 and the free-running clock introduces a slight variable offset between the ideal sampling point and the first rising edge of the A2 clock This offset is indicated by $t_0$ in FIG. 10 and can vary by ±12.5 ns about the one-quarter and three-quarter sampling points.

Once the A2 and A2 waveforms are gated on by the clock generation and control circuit 78, it takes two complete cycles of A2 and A2 to propagate the transitions 300a an 300b to the fourth flipflops of the shift registers 74 and 75. Thus, at transition 376, the three-quarter point samples of the waveforms A0 and A1 are clocked into the first flipflops of the shift registers by the clock edge 306, into the second flipflops by clock edge 377, into the third flipflops by clock edge 378, and into the fourth flipflops by the clock edge 381. At this point, the outputs A7 and A8 transition at 390 and 391, respectively, corresponding, to transitions 370a and 370b, respectively, in waveforms A0 and A1. Recall that the first two flipflops of the shift register 75 were preset by the following edge of the SYNCH TRANSITION signal when the previous frame ended. This positive level is clocked into the third flipflop of the register 75 by clock edge 376 and into the fourth register by clock edge 377.

The ENVELOPE signal A5 is generated in response to the positive transition of the SYNCH TRANSITION signal after a delay of one clock period of the A2 signal through the flipflop 200 (FIG. 7). Thus, the positive-going SYNCH TRANSITION signal is clocked into flipflop 200 by rising edge 377 of the A2 signal and the ENVELOPE signal A5 is available from the frame envelope detection circuit 84 at the output. The rising edge 395 of the ENVELOPE signal is illustrated in FIG. 10 as being coincident with the rising edge 377 of the A2 clock signal.

The RESET signal (waveform A6 in FIG. 10) stays high until the end of the frame occurs, which is indicated by a period between signal transitions of the A0 or A1 waveforms exceeding 100 ns. The shift registers 74 and 75 look for the first period in excess of this period in either of the retimed data waveforms during which no signal transitions occur. In FIG. 10, this occurs beginning with the transition 400 in waveform A0. Since the maximum intra-frame transition period is 100 ns, the retimer looks at a period via the shift register 74 and 75, which is greater than this time. In this embodiment, the shift registers inspect a 150 ns period to generate the RESET signal when either of these registers has positive level samples for this length of time. Thus, when the positive level following the rising edge 402 in waveform A7 reaches the sixth flipflop in the shift register 74, only one more positive transition of the A2 clock is required to fill the shift register with 150 ns of unvarying samples. This occurs at the rising edge 404 of the A2 clock, which results in the negative pulse 336 of the RESET signal and the falling edge 408 of the ENVELOPE waveform A5.

The operation of the decoder is indicated by the waveforms NRZ, A4, and A3 in FIG. 10. In this regard, the NRZ waveform represents the decoded waveform output by the flipflop 286 and includes a single pulse of 100 ns in duration, beginning with transition 412 and representing the first bit-cell. As shown in FIG. 10, the ENVELOPE signal available from the decoder output (FIG. 8) frames the NRZ data, while the reconstituted clock, RCLK, allows the NRZ data to be interrupted at each positive edge of the RCLK signal. Since all of the following data cells contain zeros, the NRZ waveform displays no further transitions after 312. In FIG. 10 also, the relationship between system clocks A3 and A4 is shown, allowing for a 25 ns resolution in timing. The NRZ waveform is output from the decoder in phase with the first positive transition 445 of the A3 system clock signal as previously described. In addition, the ENVELOPE waveform gates RCLK (the inverse of A3) while the NRZ signal is valid.

Obviously many modifications and variations of this invention are possible in light of these teachings, and is therefore to be understood that the invention may be practiced otherwise than as specifically described, without departing from the spirit of the claims below. For example, the synch bit signal transition pattern of the Manchester-encoded waveform may be the inverse of that described above. That is, the first transition may be a negative-going transition and the second a positive-going transition. Those reasonably skilled in the art will be able to adapt the retimer as described above to respond to the second transition as taught in this invention.

We claim:

1. A retiming decoder/encoder apparatus for receiving and producing a multi-cell Manchester-encoded waveform including a plurality of data frames, each data frame including an initial synchronizing portion followed by a data portion, the apparatus comprising:

a transceiver responsive to a received Manchester-encoded waveform for producing a first bilevel data signal corresponding to the received Manchester-encoded waveform and responsive to a second bilevel data signal for producing a transmitted Manchester-encoded waveform corresponding to the second bilevel data signal;

a digital retiming means connected to the transceiver and responsive to a synchronizing portion of the first bilevel data signal and to the first bilevel data signal for producing a retimed data signal corresponding to the received Manchester-encoded waveform;

a storage means in the digital retiming means for receiving and shifting the first bilevel data signal to produce a reset signal signifying the end of a data frame including the synchronizing portion;

a digital detector means in the digital retiming means responsive to the synchronizing portion and to the reset signal for producing an envelope signal identifying the boundaries of the data frame;

a digital decoder, connected to the retiming means and responsive to the retimed data signal and to the envelope signal, for producing an output data signal representing a decoded form of the portion of the received Manchester-encoded waveform contained in the data frame; and a digital encoder responsive to an input data signal in the decoded form and connected to the transceiver for producing the second bilevel data signal, the second bilevel data signal corresponding to the input data signal.

2. The apparatus of claim 1, wherein the synchronizing portion includes first and second transitions, the digital retiming means including a synch detector responsive to the second transition for producing a synch transition signal, and wherein the storage means is connected to the synch detector and is responsive to the synch transition signal and to the first bilevel data signal for producing the reset signal.

3. The apparatus of claim 2, wherein the storage means comprises:
   a shift register including a plurality of serially-connected storage elements for serially shifting the first bilevel data signal; and
   a gate means connected to the serially-connected storage elements for producing the reset signal in response to an absence of transitions in the first bilevel data signal for a predetermined period of time.

4. The apparatus of claim 3, wherein the retiming means include means connected to a serially-connected storage element for producing the retimed data signal in response to the reset signal and to the shifted first bilevel data signal.

5. The apparatus of claim 2, wherein the gate means is further for producing the reset signal in response to a latch up prevention signal, the digital retiming means further including latch up prevention means connected to the storage means, to the synch detector, and to the gate means for producing the latch up prevention signal in response to an absence of level difference between the synch transition signal and the shifted first bilevel data signal.

6. A data retimer for processing a complementary pair of bilevel data waveforms which correspond to a transmitted Manchester-encoded waveform, the Manchester-encoded waveform including a data frame begun by a synch bit with first and second transitions and including a plurality of adjacent data cells defined by signalling transitions separated by a maximum signalling time, the data retimer comprising;
   retiming means responsive to the pair of bilevel data waveforms for removing timing distortion from each waveform of the pair of bilevel data waveforms;
   a synch transition detector, responsive to a second transition in a synch bit of the pair of bilevel data waveforms for producing a synch transition signal;
   a digital clock generator connected to the synch transition detector for providing a complementary pair of sampling clock waveforms in response to the synch transition signal;
   a shift register means connected to the retiming means, to the synch transition detector, and to the digital clock generator for shifting the pair of bilevel data waveforms in response to the pair of sampling clock waveforms, the shift register means defining a period of time substantially equal to the maximum signalling time; and
   gate means connected to the shift register means for generating a reset signal signifying the end of a frame in response to an absence of transitions in portions of the bilevel data waveforms in the shift register means.

7. The data retimer of claim 6 wherein the retiming means include a first flipflop and a second flipflop, each flipflop having set and clear inputs, the first waveform of the pair of bilevel data waveforms connected to the clear input of the first flipflop and to the set input of the second flipflop, the second waveform of the pair of bilevel data waveforms connected to the set input of the first flipflop and to the clear input of the second flipflop, each flipflop further having an output, the first flipflop output providing a first retimed waveform corresponding to the first waveform and the second flipflop output providing a second retimed waveform corresponding to the second waveform.

8. The data retimer of claim 7 wherein the first waveform is a positive waveform and the second waveform is the complement of the first waveform, the synch transition detector including:
   an inverting gate having a pair of inputs and an output, a first input of the pair of inputs connected to a constant signal level and the second input of the pair of inputs connected to receive the second waveform, the inverting gate producing a level transition in response to a first transition in the second waveform; and
   a flipflop having a clocking input connected to the output of the inverting gate, a data input connected to a constant signal level, a clear input connected to the gate means, and an output at which the synch transition signal rises in response to the level transition and falls in response to the reset signal.

9. The data retimer of claim 6, wherein:
   the shift register means comprises a first shift register including a plurality of serially-connected storage elements for serially shifting a first waveform of the pair of bilevel data waveforms and a second shift register including a plurality of the serially-connected storage elements for serially shifting a second waveform of the pair of bilevel data waveforms; and
   the gate means includes a first inverting gate having an output and a plurality of inputs, each input connected to a respective one of the serially-connected storage elements of the first shift register, a second inverting gate having an output and a plurality of inputs, each connected to a respective one of the serially-connected storage elements of the second shift register, and a NAND gate with at least two inputs and an output, the first input of the NAND gate connected to the output of first inverting gate and the second input of the NAND gate connected to the output of the second inverted gate, the output of the NAND gate generating the reset signal in response to a transition at the output of the first inverting gate or the second inverting gate.

10. The data retimer of claim 6 further including an envelope means connected to the synch transition detector and to the gate means for producing an envelope signal identifying data frame boundaries in the pair of bilevel data waveforms in response to the synch transition and reset signals.

11. The data retimer of claim 6 wherein the gate means is further for generating the reset signal in response to a latch release signal, the data retimer further including a latch release means connected to the synch transition detector, the shift register means, and the gate means for producing the latch release signal in response to an absence of level difference between the synch transition signal, a first waveform of the pair of bilevel data waveforms, and a second waveform of the pair of bilevel data waveforms.

12. A retiming decoder/encoder for connection to a transceiving means, the transceiving means for producing a first bilevel data signal in response to a received Manchester-encoded waveform in which a plurality of data frames occur, each data frame including an initial synch bit followed by a data portion, and for producing the transmitted Manchester-encoded waveform in response to a second bilevel data signal, the retiming decoder/encoder comprising:

a digital retimer responsive to a synch bit of the first bilevel data signal and to the first bilevel data signal for producing a time-shifted, retimed data signal corresponding to the first bilevel data signal;

shift register means in the digital retimer for receiving and shifting the first bilevel data signal to produce a reset signal signifying the end a data frame including the synch bit;

an envelope means in the digital retimer responsive to the synch bit and to the reset signal for producing an envelope signal identifying the boundaries of the data frame;

a digital decoder, connected to the digital retimer, response to the shifted data signal and to the envelope signal for decoding the shifted signal to produce a decoded form of the received Manchester-encoded waveform contained in the data frame; and a digital encoder responsive to an input data signal in the decoded form for producing the second bilevel data signal.

13. The retiming decoder/encoder of claim 12, wherein the synch bit includes first and second transitions, the digital retimer including a synch detector responsive to the second transition for producing a synch transition signal, and wherein the shift register means is connected to the synch detector and is responsive to the synch transition signal and to the first bilevel data signal for producing the reset signal.

14. The apparatus of claim 13, wherein the shift register means comprises:

a shift register including a plurality of serially-connected storage elements for serially shifting the first bilevel data signal; and a gate means connected to the serially-connected storage elements for producing the reset signal in response to an absence of transitions in the bilevel data signal for a predetermined period of time.

15. The apparatus of claim 14, wherein the retiming means include means connected to a serially-connected storage element for producing the retimed data signal in response to the reset signal and to the shifted first bilevel data signal.

16. The apparatus of claim 14, wherein the gate means is further for producing the reset signal in response to a latch up prevention signal, the digital retimer further including latch up prevention means connected to the shift register means, to the synch detector, and to the gate means for producing the latch up prevention signal in response to an absence of level difference between the synch transition signal and the shifted first bilevel signal.

17. The retiming decoder/encoder of claim 13, wherein:

the digital retimer further includes a digital clock generator connected to the synch transition detector for providing sampling clock waveform in response to the synch transition signal; and the digital decoder includes:

a decoding means connected to the digital clock generator, to the shift register means, and to the envelope means for producing a decoded data signal corresponding to the portion of the received Manchester-encoded waveform in the data frame; and a synchronizing means connected to the decoding means and to the envelope means, and responsive to a system clock signal for producing a decoding envelope signal and a decoding clock signal synchronized with the decoded data signal, the decoding envelope signal identifying the boundaries of the data frame in the decoded data signal.

18. A digital decoder for decoding a bilevel data waveform which corresponds to a transmitted Manchester-encoded waveform, the Manchester-encoded waveform including a data frame begun by a synch bit and including a sequence of data cells defined by signalling transitions, the digital decoder comprising:

a Manchester decoder responsive to the bilevel data waveform, to an envelope signal identifying data frame boundaries in the bilevel data waveform, and to a decoding clock signal having a clock rate, the decoding clock signal synchronized with the envelope signal and the bilevel data waveform, the Manchester decoder for producing a decoded non-return to zero signal corresponding to the Manchester-encoded waveform; and a synchronizer connected to the Manchester decoder and responsive to the envelope signal and a system clock signal having half the clock rate of the decoding clock signal for producing, in synchronism with the decoded NRZ signal, a data envelope signal identifying data frame boundaries in the decoded NRZ signal, and a reconstituted clock signal.

19. The digital decoder of claim 18, wherein the system clock signal includes a first system clock signal, a second system clock signal which is the complement of the first system clock signal, and a third system clock signal offset from the first system clock signal by a phase difference which is greater than 0° and less than 90°, the synchronizer comprising:

a gate signal circuit responsive to the envelope signal and to the third system clock signal for producing a gating signal in response to an initial transition of the envelope signal, the gating signal conditioned by a state of the third system clock signal;

a first gate circuit connected to the gate signal circuit and to the Manchester-decoder for providing the NRZ data signal and the data envelope signal in response to the first system clock signal and to the conditioning of the gating signal by a first state of the system third clock signal; and a second gate circuit connected to the gate signal circuit and to the Manchester-decoder for providing NRZ data signal and the data envelope signal in response to the first system clock signal, the second system clock signal, and to the conditioning of the gating signal by a second state of the third system clock signal.

20. The digital decoder of claim 19 further including a reconstituted clock signal means connected to the first and second gate circuits for providing the reconstituted clock signal in response to the data envelope signal and the second clock signal.

* * * * *